United States Patent
Tamaki et al.

(10) Patent No.: US 8,189,701 B2
(45) Date of Patent: *May 29, 2012

(54) ADAPTIVE MODULATION SCHEME AND DATA RATE CONTROL METHOD

(75) Inventors: Satoshi Tamaki, Kokubunji (JP); Takashi Yano, Tokorozawa (JP); Toshiyuki Saito, Kokubunji (JP); Seishi Hanaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,413

(22) Filed: Aug. 23, 2010

(65) Prior Publication Data

US 2011/0122957 A1    May 26, 2011

Related U.S. Application Data

(63) Continuation of application No. 11/028,938, filed on Jan. 5, 2005, now Pat. No. 7,801,236.

(30) Foreign Application Priority Data

Mar. 5, 2004    (JP) .................................. 2004-061578

(51) Int. Cl.
    *H04L 27/28*    (2006.01)
(52) U.S. Cl. ...................................................... 375/260
(58) Field of Classification Search .................. 375/260, 375/267, 299, 347
    See application file for complete search history.

(56) References Cited

U.S. PATENT DOCUMENTS

| | | | |
|---|---|---|---|
| 6,456,649 B1 | 9/2002 | Isaksson et al. | |
| 6,459,678 B1 | 10/2002 | Herzberg | |
| 7,685,500 B2 * | 3/2010 | Jacobsen et al. | 714/774 |
| 2003/0067991 A1 * | 4/2003 | Okamoto | 375/262 |
| 2004/0001539 A1 * | 1/2004 | Sankaran et al. | 375/231 |
| 2005/0088959 A1 | 4/2005 | Kadous | |
| 2006/0093067 A1 | 5/2006 | Jalali et al. | |

FOREIGN PATENT DOCUMENTS

| | | |
|---|---|---|
| JP | 08-265304 | 10/1998 |
| JP | 2003-244257 | 8/2003 |

OTHER PUBLICATIONS

U.S. Appl. No. 10/894,062, filed Jul. 20, 2004, Hanaoka et al.
U.S. Appl. No. 10/760,299, filed Jan. 21, 2004, Tamaki et al.

(Continued)

*Primary Examiner* — Don N Vo

(74) *Attorney, Agent, or Firm* — Antonelli, Terry, Stout & Kraus, LLP.

(57) ABSTRACT

A radio communication system includes a first radio station for dividing codewords into communication units and transmitting the divided codewords by modulating them in every communication unit, and a second radio station for coupling and decoding signals obtained by demodulating the communication units. The radio stations have common information of first bits, equal to maximum bits per symbol of the communication units, and an encoding type list. The first station modulates and transmits the communication units with a modulation type with second bits. The second radio station receives the communication units modulated by the first radio station, demodulates the communication units with a modulation type with third bits, combines and decodes the demodulated signals with encoding types in the encoding type list, and obtains a result of the decoding, as reception information, by an encoding type in which no error is detected in the result of decoding.

9 Claims, 12 Drawing Sheets

OTHER PUBLICATIONS

Hanaoka, et al., "Adaptive Demodulation Method on QAM—Likelihood Control for Demodulating QAM Signal", Communication Society, The Institute of Electronics Information and Communication Engineers Sep. 10, 2003, p. 400, B-5-63, Japanese Language Original and English Language Translation Provided.

"Transmission Characteristic of Modulation Level Variable Adaptive Modulation Type", (B-II vol. J78-B-II No. 6 pp. 435-444, Jun. 1995 of the Transactions of the Institute of Electronics, Information and Communication Engineers).

"OFDM Adaptive Modulation type utilizing Multilevel Transmission Power Control for High-Speed Data Communication" (B-II vol. J84-B-II No. 7 pp. 1141-1150, Jul. 2001 of the Transactions of the Institute of Electronics, Information and Communication Engineers).

* cited by examiner

FIG.2
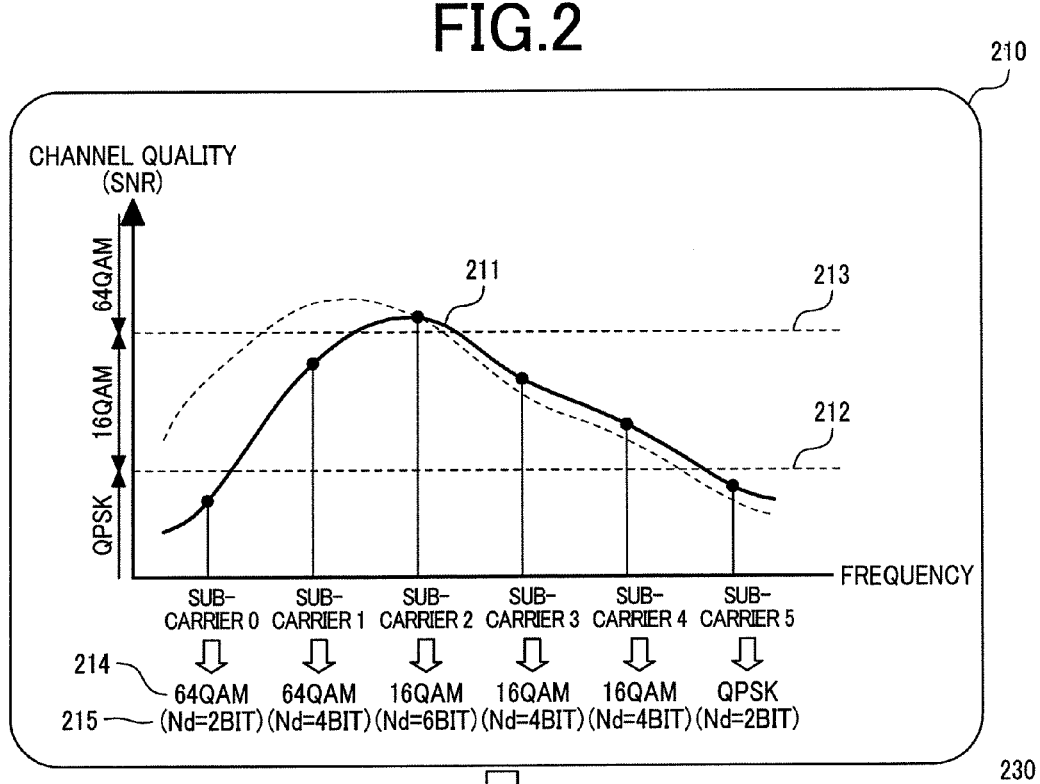
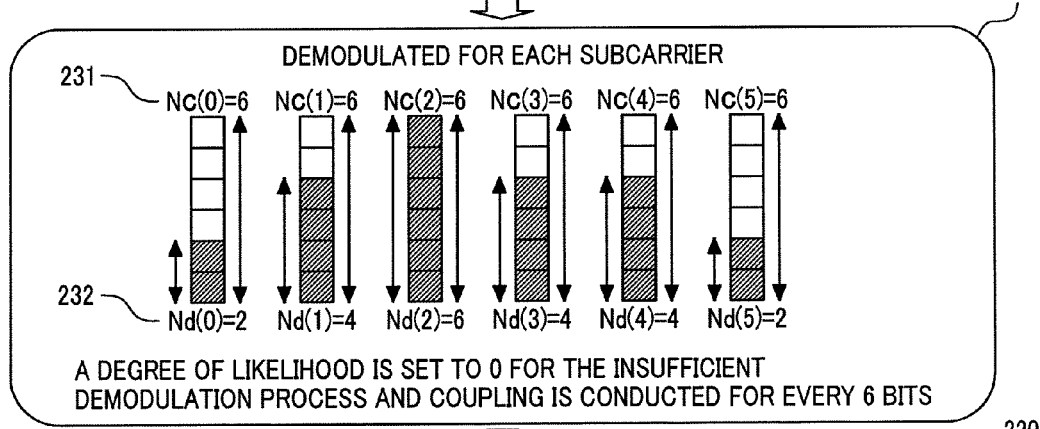
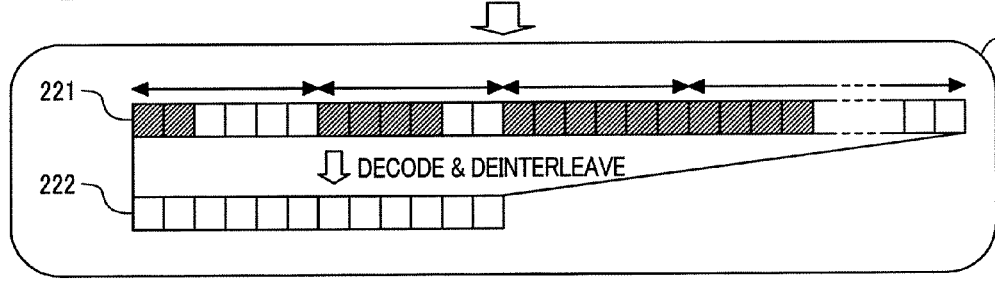

ADAPTIVE MODULATION SCHEME AND DATA RATE CONTROL METHOD

CROSS REFERENCE TO RELATED APPLICATION

This is a continuation of U.S. application Ser. No. 11/028,938, filed Jan. 5, 2005 (now U.S. Pat. No. 7,801,236). This application relates to and claims priority from Japanese Patent Application No. 2004-061578, filed on Mar. 5, 2004. The entirety of the contents and subject matter of all of the above is incorporated herein by reference.

FIELD OF THE INVENTION

The present invention relates in general, to a radio communication system; and, more particularly, the invention relates to a modulation type and data rate control method which can adapt to variations in the quality in each propagation path in a radio communication system using multiple propagation paths, such as provided in a multi-carrier radio communication system.

BACKGROUND OF THE INVENTION

In view of the increasing data rate per time in the conventional radio communication system, a multi-level modulation technique for propagating information of multiple bits per symbol has been developed. In such a multi-level modulation technique, the maximum throughput increases, when the quality of the propagation paths is further improved, as the number of bits per symbol increases. On the other hand, the throughput largely decreases, when the quality of the propagation paths is lowered, as the number of bits per symbol increases. Therefore, an adaptive modulation technique has been proposed to switch the modulation levels according to the quality of the propagation paths so as to realize stable communication. This technique has been described in the paper titled "Transmission Characteristic of Modulation Level Variable Adaptive Modulation Type" (B-II Vol. J78-B-II No. 6 pp. 435-444, June 1995 of The Transactions of the Institute of Electronics, Information and Communication Engineers) (Non-Patent Document 1).

Moreover, with the frequency band of radio communication expanding, the OFDM (Orthogonal Frequency Division Multiplexing) system for transmitting information by dividing a transmission into many orthogonal subcarriers has been used, and the OFDM adaptive modulation type system to switch the modulation type for each subcarrier has also been proposed to cover a difference in the quality of the propagation paths within the OFDM bandwidth. This technique has been described in the paper titled "OFDM Adaptive Modulation type utilizing Multilevel Transmission Power Control for High-Speed Data Communication" (B-II Vol. J84-B-II No. 7 pp. 1141-1150, July 2001, of The Transactions of the Institute of Electronics, Information and Communication Engineers) (Non-patent document 2).

Patent Document 1] "Transmission Characteristic of Modulation Level Variable Adaptive Modulation type" (B-II Vol. J78-II No. 6 pp. 435-444, June, 1995, of The Transactions of the Institute of Electronics, Information and Communication Engineers) by Otsuki, et al.

[Patent Document 2] "OFDM Adaptive Modulation type utilizing Multilevel Transmission Power Control for High-Speed Data Communication" (B-II Vol. J84-B-II No. 7 pp. 1141-1150, July, 2001, of The Transactions of the Institute of Electronics, Information and Communication Engineers) by Yoshiki, et al.

Both a transmitter station and a receiver station need to have common information on a modulation type in order for the receiver station to perform correct demodulation during switching of the modulation type according to a variation in the propagation path by the conventional adaptive modulation technique.

If the transmitter station and the receiver station have a different modulation type, the data location is deviated and continuous errors occur. Therefore, in the scheme, for example, where the modulation type is communicated from a transmitter station to a receiver station, the signal carrying this information must always be sent with a higher accuracy. Moreover, even in the case where the receiver station assumes, for example, the modulation type from the received signal, a training signal for highly accurate estimation is necessary.

Therefore, when it is attempted to control the modulation type for each subcarrier in the OFDM system, a problem arises, in that the throughput of the data signal itself is suppressed because the signals for controlling the modulation type, such as the modulation type, indicating signal and the training signal, increase. On the contrary, when the number of signals for controlling the modulation type, such as the modulation type indicating signal and the training signal, is reduced so as to not suppress the throughput of the data signal, a problem also arises in that the degree of freedom in the modulation type control is reduced, fine control becomes impossible, and communication by fully utilizing the propagation path cannot be realized.

SUMMARY OF THE INVENTION

The present invention has been conceived and developed to solve the problems described above. In the case where the modulation type is controlled for each subcarrier in the OFDM, for example, communication can be realized even if the modulation type is not always matched precisely between the transmitter station and receiver station. Therefore, an object of the present invention is to provide a radio communication system in which the modulation type can be switched for each subcarrier, while the number of control signals for controlling the modulation type is reduced, and the throughput of the communication as a whole can be controlled according to the total quality of the propagation path.

As a means for solving the problems described above, in the adaptive modulation and encoding type system of the present invention, the transmitter station and receiver station have, in common, the maximum transmission bits per symbol in each subcarrier and list information of the encoding type to be selected.

The transmitter station selects the modulation type in the subcarrier from the propagation path quality of each subcarrier, performs channel encoding by selecting the encoding type from the above-stated list based on the bit number information which may be used for the communication in the selected modulation type, and divides the code in units of the maximum transmission bit number per symbol to each subcarrier. In each subcarrier, only the bits that can be transmitted in the selected modulation type among the distributed bits are modulated for transmission.

The receiver station performs demodulation by selecting the modulation type used for demodulation in the subcarrier from the quality of propagation paths of each subcarrier, summarizes the result of demodulation with addition of the signal suggesting reception of the signal in the degree of likeliness of 0 when the number of bits obtained by the demodulation per symbol is less than the maximum bits per symbol, executes, to this demodulation result, on trial, the demodulation in the encoding type listed in the channel encoding type list, and determines the transmission of the information obtained as a result of demodulation when the demodulation is completed successfully.

With the method described above, the modulation type can be switched for each subcarrier according to the propagation path without attempting accurate matching of the modulation type between the transmitter station and the receiver station. Moreover, the throughput can be controlled according to the average quality of the propagation paths.

According to the present invention, a system is provided in which the number of bits to be propagated per symbol can be switched according to variation of the propagation path without communication of the modulation type information between the transmitter station and receiver station, and the optimum throughput can also be selected for communication according to variation in the propagation paths.

BRIEF DESCRIPTION OF THE DRAWINGS

FIG. 2 is a diagram showing an example of adaptive demodulation and decoding employed in a receiver station in accordance with the present invention;

DETAILED DESCRIPTION OF THE PREFERRED EMBODIMENTS

Preferred embodiments of the present invention will be described with reference to the accompanying drawings. However, as an example, the maximum number of bits per symbol of each subcarrier is set to 6 bits and as a modulation type, an adaptive modulation type using 64 QAM or 16 QAM or QPSK has been used. However, it should be understood that the present invention is not limited to such maximum bits and modulation type. Namely, the present invention can be adapted in general to a system in which the maximum bits per symbol is set to 2 m bits and demodulation is conducted with the $2^{2k}$QAM (k is a natural number equal to or less than m) modulation type. Moreover, the 4QAM modulation type, in which k=1, indicates a modulation type similar to QPSK.

First, an example of the configuration of the transmitter station and the receiver station and the flow of signals will be described on the basis of the structural diagrams of the transmitter station and receiver station, using the adaptive modulation and channel encoding types of the present invention, as illustrated in FIG. 5 to FIG. 8.

However, in the following description, only the structure used for adapting the modulation and demodulation types, in accordance with the present invention, to a communication from the transmitter station to the receiver station will be described. Actually, however, it is also possible in accordance with the present invention to carry out two-way communication by providing both the functions of the transmitter station and the functions of the receiver station to only one communication apparatus. Moreover, the transmitter station and receiver station in accordance with the present invention are used for a radio station for conducting modulation of a data signal and a radio station for conducting demodulation. Any one of these stations may be defined as a base station and a mobile terminal station. Moreover, when these terminal stations are mutually connected, any of the terminal stations may be used as a transmitter station and a receiver station.

Figure 5:
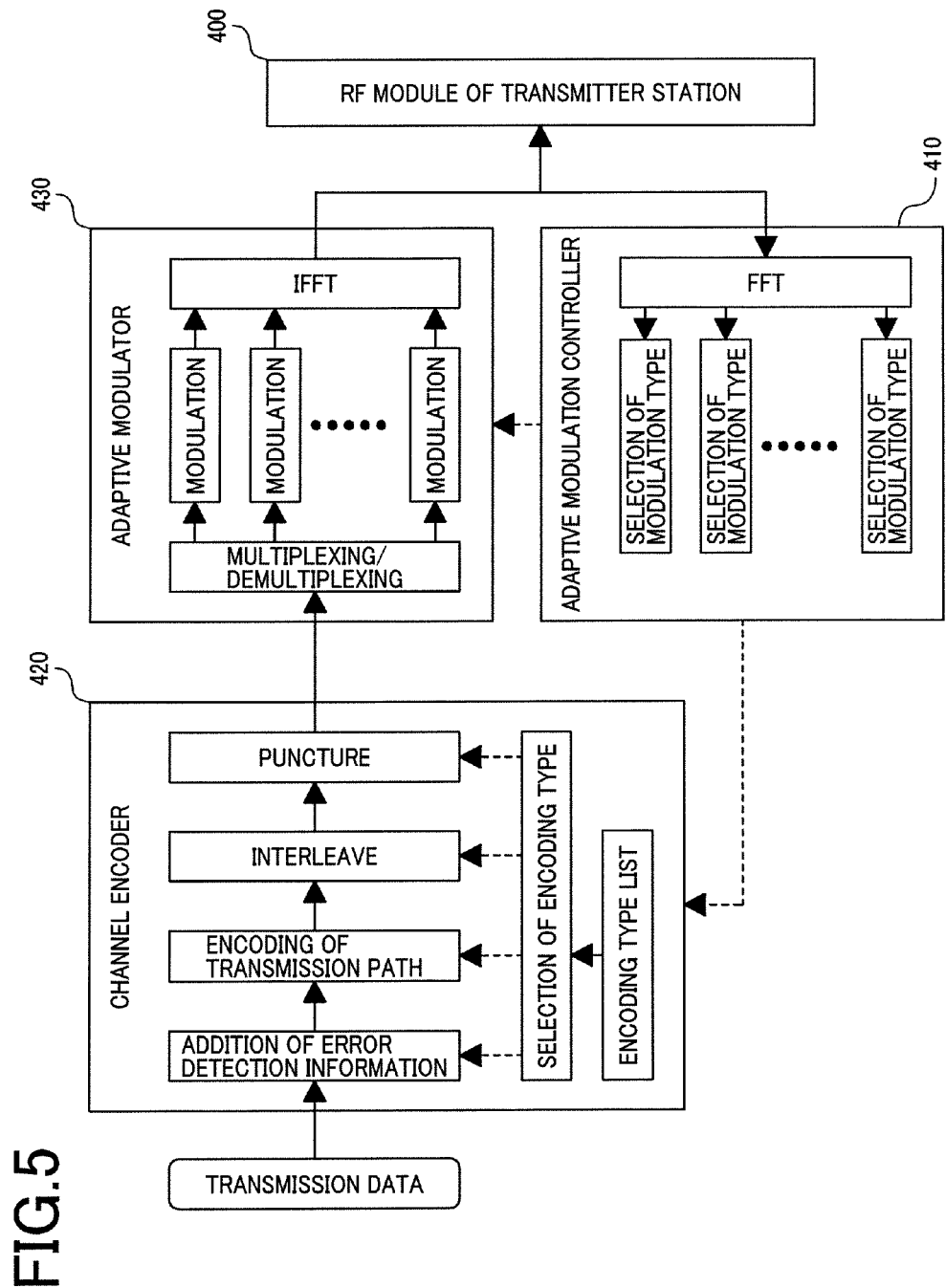
FIG. 5 is a functional block diagram showing a first embodiment of the transmitter station in accordance with the present invention.
Figure 6:
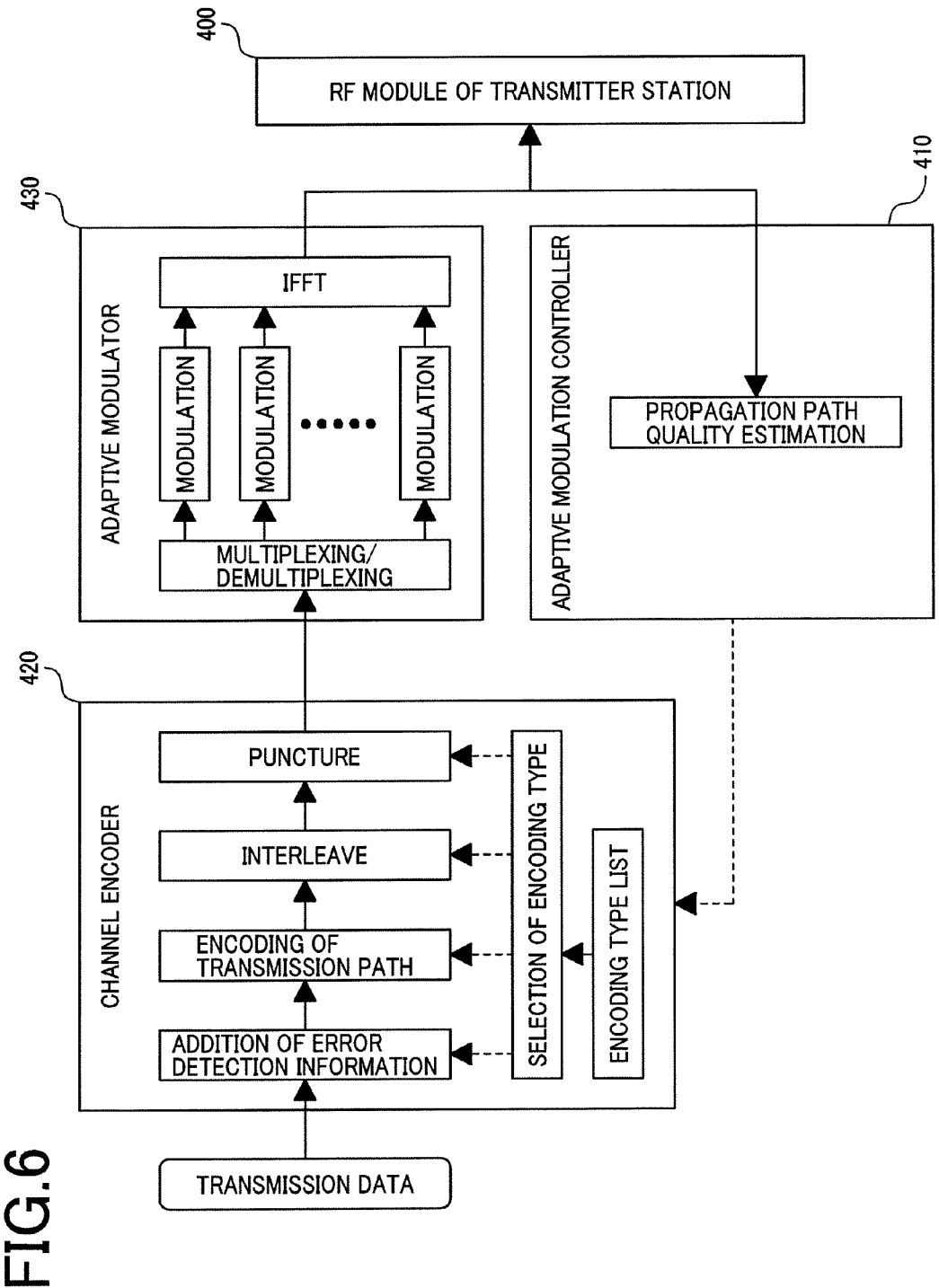
FIG. 6 is a functional block diagram showing a second embodiment of the transmitter station in accordance with the present invention.
Figure 7:
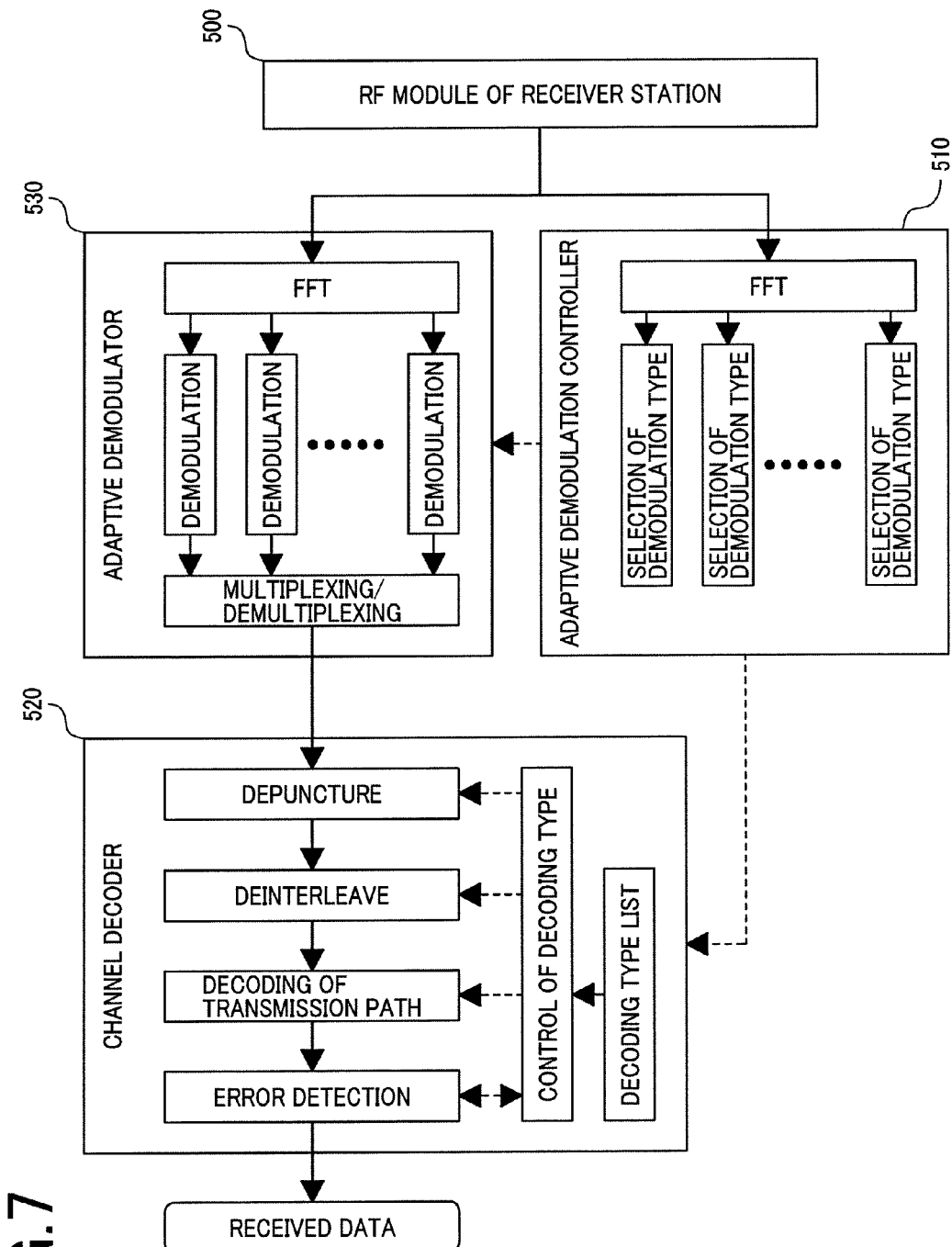
FIG. 7 is a functional block diagram showing a first embodiment of the receiver station in accordance with the present invention.
Figure 8:
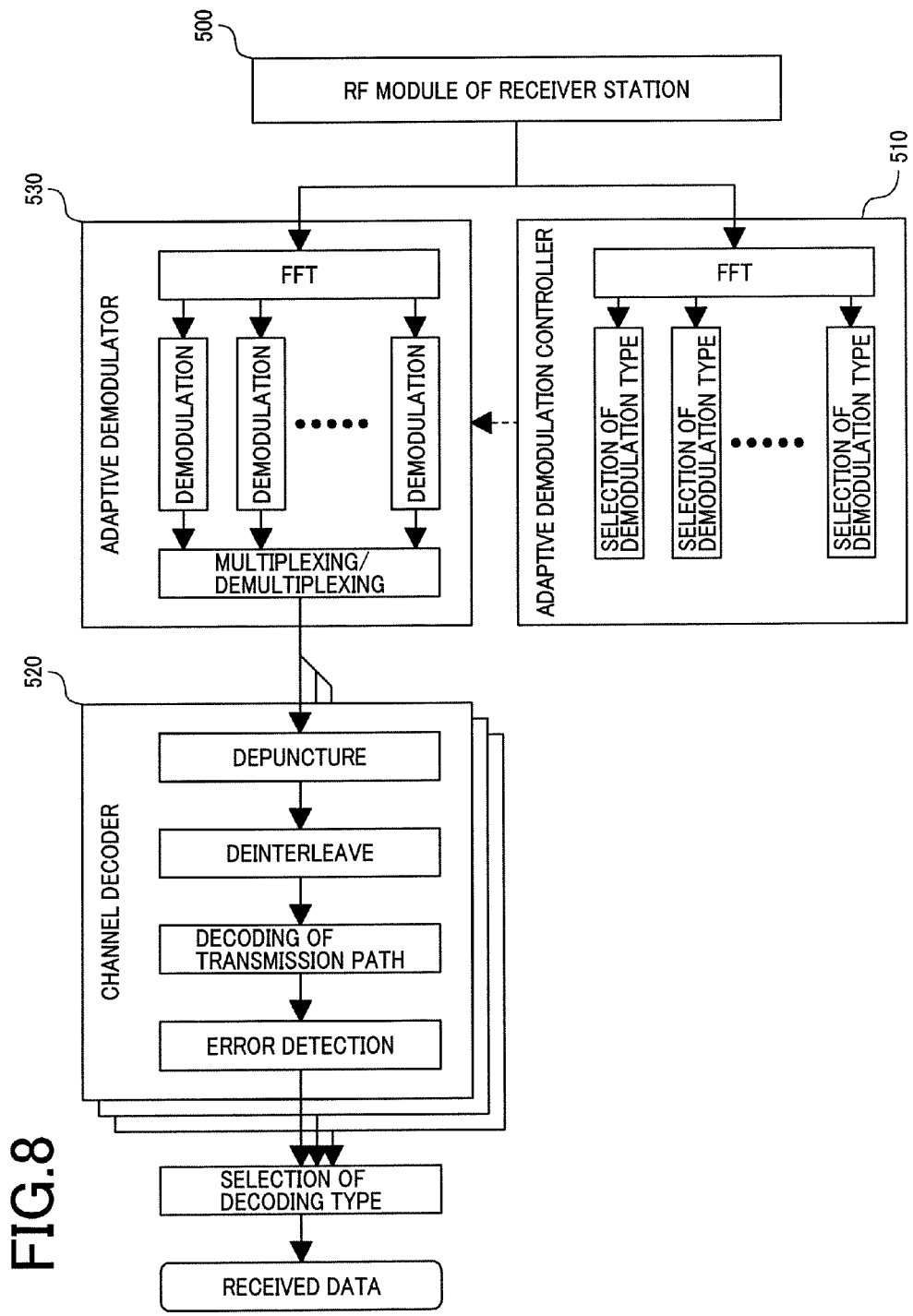
FIG. 8 is a functional block diagram showing a second embodiment of the receiver station in accordance with the present invention.

FIG. 5 illustrates a first example of the structure of a transmitter station in accordance with the present invention. FIG. 6 illustrates a second example of the structure of a transmitter station in accordance with the present invention. FIG. 7 illustrates a first example of the structure of a receiver station in accordance with the present invention. FIG. 8 illustrates a second example of the structure of a receiver station in accordance with the present invention.

On the occasion of making communication with the transmitter station of FIG. 5 or FIG. 6 and the receiver station of FIG. 7 or FIG. 8, the transmitter station and receiver station have in common the maximum bits per symbol of each subcarrier and the list information for selecting the channel encoding type, and this information is stored prior to the channel encoding of transmitted information and decoding of the received signal.

As a method of having common information in the transmitter station and receiver station, a certain scheme may be defined as part of the system, or it may also be communicated from the transmitter station or receiver station at the time of starting a communication. Moreover, in the case where any transmitter station or receiver station is defined as a base station and the other is designated as a terminal station, it is possible to introduce a method in which a notice is transmitted to the terminal station from the base station when the location is registered and hand-over is conducted, or a method may be employed in which the reference signal to be broadcasted from the base station is transmitted with inclusion of the common signal. Moreover, the number of maximum bits per symbol is determined on the basis of the condition of the propagation path, the amount of requests for communication and the performance of transmitter and receiver stations.

In the transmitter station of FIG. 5, an adaptive modulation controller 410 converts the signal received by an RF module 400 into a signal of a frequency domain with FFT (Fast Fourier Transformation), selects the modulation type based on the propagation path quality of each subcarrier, communicates respective modulation type information of each subcarrier to an adaptive modulator 430, and also communicates the total number of bits per symbol of the modulation type selected for each subcarrier to a channel encoder 420.

The channel encoder 420 selects the encoding type from the encoding type list based on the information obtained from the adaptive modulation controller 410, conducts the channel encoding based on the selected encoding type, and transfers the result of channel encoding to the adaptive modulator 430. In the channel encoding, error detection information is added to the information to be propagated using a method, such as parity and CRC; the channel encoding is conducted using, for example, the channel code, such as the convolutional code and Turbo code; the bit position in the generated codeword is varied with the interleave; and the number of bits distributed to each subcarrier includes a remainder, part of the bits being deleted with puncture.

The adaptive modulator 430 divides the data transferred from the channel encoder 420 into subcarriers, conducts the modulation with the modulation type selected by the adaptive modulation controller 410, and multiplexes each subcarrier signal into signals of a time domain using the IFFT (Inverse Fast Fourier Transformation) for transmission through the RF module 400.

The signal propagated from the transmitter station of FIG. 5 is received, for example, by a receiver station having the structure illustrated in FIG. 7. In the receiver station of FIG. 7, an adaptive modulation controller 510, using the FFT, converts the signal received by an RF module 500 into signals of the frequency domain; selects the modulation type used for demodulation on the basis of the propagation path quality of each subcarrier; communicates the respective modulation type information used for demodulation of each subcarrier to an adaptive demodulator 530; and communicates the total number of bits per symbol of the modulation type used for demodulation selected for each subcarrier to a channel decoder 520.

The adaptive demodulator 530 converts the signal received by the RF module 500 to signals in the frequency domain with the FFT; demodulates the signal using the modulation type indicated by the adaptive demodulation controller for each subcarrier; assumes the reception of the signal having a degree of likeliness of 0 as much as the shortage when the number of bits per symbol of the modulation type used for demodulation is less than the maximum number of bits per symbol determined previously for the transmitter station; outputs the result of demodulation of the maximum number of bits per symbol for each symbol from each subcarrier; and then transfers all multiplexed carriers to a channel decoder.

The channel decoder 520 selects the encoding type from the encoding type list, performs depuncture, deinterleave of the data transferred from the adaptive demodulator 530 according to the selected encoding type and the decoding of the channel code, and determines whether the decoding result is erroneous or not using the error detection information added at the time of transmission.

When the decoding result is determined to be not erroneous, the channel decoder 520 outputs the determined decoding result as the received signal. When the decoding result is determined to be erroneous, another encoding type is selected from the preceding encoding type list and similar decoding is attempted again. Moreover, when the decoding result is determined to be erroneous for all encoding types in the list, an indication of failure of decoding is outputted.

In the trial operation of the channel decoder 520, as the type for determining the selection sequence from the list of the encoding type to be used for the decoding, it is possible to previously determine a simple sequence of selection before starting the communication to always select a predetermined sequence. As another type, it is also possible that the reception quality is communicated from the adaptive demodulation controller 510, the encoding type of a higher channel encoding rate is attempted with priority for the trial when the reception quality is high, and the encoding type of a lower channel encoding rate is selected with priority when the reception quality is low. As yet another type, it is also possible to select and attempt with priority, an encoding type which has succeeded in the decoding used in the preceding decoding operation. This encoding type is suitable when the quality change in the propagation path is comparatively gradual. In addition, as still another type of encoding, it is also possible to communicate the encoding type selected by the transmitter station for the channel encoder 420 to the receiver station, in response to which the receiver station selects and performs on trial with priority the encoding type indicated by the transmitter station.

The receiver station in accordance with the present invention may also be realized with a structure such as that shown in FIG. 8, in place of the structure shown in FIG. 7. In the receiver station of FIG. 7, the adaptive demodulation controller 510 and adaptive demodulator 530 execute processes similar to those of the adaptive demodulation controller 510 and adaptive demodulator 530 in the receiver station of the structure of FIG. 6. The channel decoder 520 of the receiver station of FIG. 8 is provided with depuncture, deinterleave, propagation path decoding and error detecting functions for each list of the encoding type and is also capable of outputting, as received information, an output of the channel decoder which has been proven to be not erroneous as a result of the error detection process.

The structure of the transmitter station in accordance with the present invention as illustrated in FIG. 5 may be replaced, for example, with the structure of FIG. 6. In the transmitter station in the structure of FIG. 6, the adaptive modulation controller 410 measures the total quality of the propagation path from the signal received by the RF module 400 and the result to the channel sends encoder 420.

The channel encoder 420 selects the encoding type from the encoding type list on the basis of the information obtained from the adaptive modulation controller 410, executes the encoding based on the selected encoding type, and transfers the result to the adaptive modulator 430. In the encoding process, the error detection information, such as parity bits or CRC bits, is added to the information to be transmitted. Moreover, the information is encoded with the channel code, such as the convolutional code and Turbo code. The bit location in the generated codeword is altered with the interleaving, and if any bits remain after it has been distributed to each subcarrier, the bits are punctured.

The adaptive modulator 430 divides the data transferred from the channel encoder 420 to each subcarrier, executes the modulation using the modulation type for propagating the maximum bits per symbol as determined for the receiver station in all subcarriers, and transmits the data to the RF module 400 through multiplexing of each subcarrier signal into signals in the time domain using IFFT (Inverse Fast Fourier Transformation).

In the transmitter station having the structure of FIG. 6, switching of the modulation type according to the propagation path quality of each subcarrier is not performed in comparison with the transfer station have the structure of FIG. 5.

However, since the receiver station of FIG. 7 and FIG. 8 switches the modulation type used for demodulation according to the propagation path quality of each subcarrier, it is possible to achieve the advantage that the structure of the transmitter station can be simplified, while the communication is realized by utilizing the difference in the quality of the propagation paths of each subcarrier.

Moreover, the present invention is also applicable even when it is difficult to measure the difference in the propagation path quality of each subcarrier in the transfer station, while the frequency, for example, used for communication to the receiver station from the transmitter station is different from that used for communication to the transmitter station from the receiver station by using the transmitter station having the structure of FIG. 6. In this case, it is preferable that the reception quality is received as feedback information from the receiver station.

Next, a detail description will be presented below concerning the modulation type and encoding type in accordance with the present invention in the transmitter station and receiver station with reference to FIG. 1 and FIG. 2.

The transmitter station and receiver station have in common the maximum bits Nc per symbol of each subcarrier and information consisting of a selectable encoding type list. In the following description and accompanying figures, a value expressed as Nc indicates the maximum bits per symbol of each subcarrier.

The adaptive modulation controller, channel encoder, and adaptive modulator in the transmitter station will be described in detail with reference to FIG. 1. In the transmitter station, the adaptive modulation controller 110 selects the modulation type 114 of each subcarrier on the basis of the propagation path quality 111 of each subcarrier and obtains the number of bits Nb 115 used for communication per symbol of the selected modulation type. A value expressed by Nb in the following description and figures indicates the number of bits 115 used for communication per symbol selected at the transmitter station side.

Here, for selection of the modulation type of each subcarrier, it is possible, for example, to use signal power intensity, interference power intensity, signal to interference and noise power ratio or the like as the propagation path quality.

Moreover, in regard to selection of a threshold value, the threshold value 112 is simply selected from the point of view of selecting the modulation type in which the number of modulation levels is higher than that of QPSK when the propagation path capacity of the subcarrier assumed from the propagation path quality 111 of each subcarrier is larger than 2, which is the number of bits used for communication per symbol of QPSK. Moreover, the threshold value 113 is selected from the point of view of selecting the modulation type in which the number of modulation levels is higher than that of 16QAM when the propagation path capacity is larger than 4, which is the number of bits used for communication per symbol of 16QAM. When it is further required to improve the communication quality, the threshold value can be selected according to the code, modulation type, and propagation path quality.

The channel encoder 120 performs the encoding by selecting only one encoding type from the encoding type list provided in common for the transmitter station and receiver station. An example of the criterion for selecting the encoding type is illustrated as the relationship 301 indicated with the graph of FIG. 3.

In the relationship 301, the encoding type is selected, in which the channel coding rate is smaller than the value obtained by dividing the total sum of the number of bits Nb used for communication per symbol in the modulation type selected for each subcarrier in the section to transmit one codeword with the total sum of the maximum bits Nc per symbol of each subcarrier.

Figure 1:
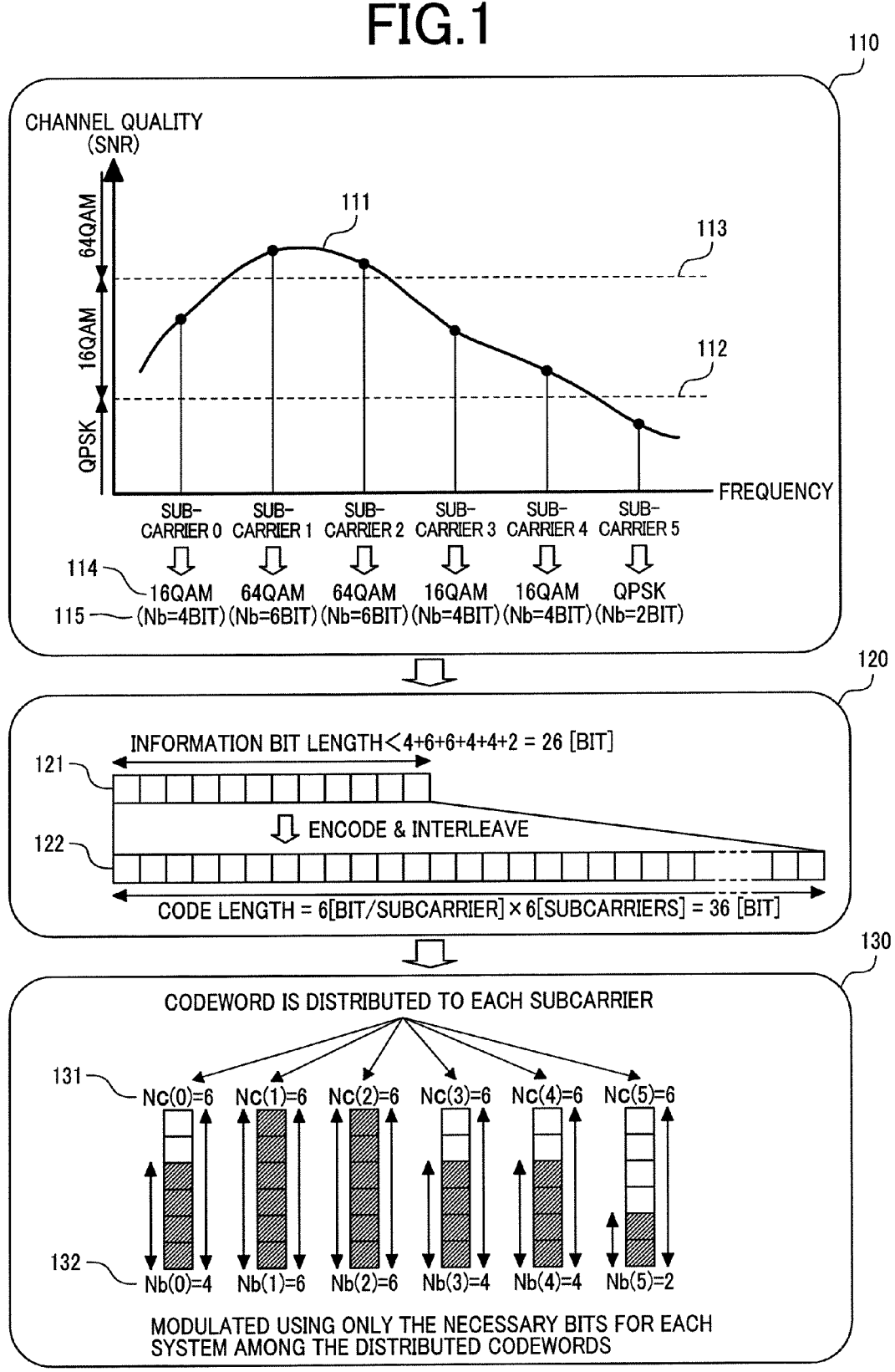
FIG. 1 is a diagram showing an example of adaptive modulation and encoding employed in a transmitter station in accordance with the present invention.

In the example of FIG. 1, for example, one code is transmitted at a time using six subcarriers. Therefore, the encoding type is selected so that a code length 122 becomes equal to a value obtained by adding the maximum bits Nc per symbol of each subcarrier for six subcarriers and an information bit length 121 becomes smaller than a value obtained by adding the number of bits Nb used for communication per symbol of the modulation type selected by each subcarrier for six subcarriers. Here, the selected encoding type is sufficient when it satisfies the condition that the channel encoding rate is smaller than the quotient between the total sum of Nb and total sum of Nc. Moreover, for example, in the case where the code is transmitted by division into n codes in the time domain, the encoding type is selected so that the code length becomes equal to the product of the total sum of Nc for all carriers used for transmission of codes and n, and the information bit length of this code becomes smaller than product of the total sum of Nb of all carriers used for transmission of codes and n.

Owing to the selection of such encoding type, as described above, the data rate can be improved because the encoding type which assures a higher channel coding rate when the propagation path quality is higher is selected, the error correction capability is improved because the encoding type which assures a lower channel encoding rate when the propagation path quality is lower is selected, and the encoding type depending on the propagation path quality is also selected.

Figure 3:
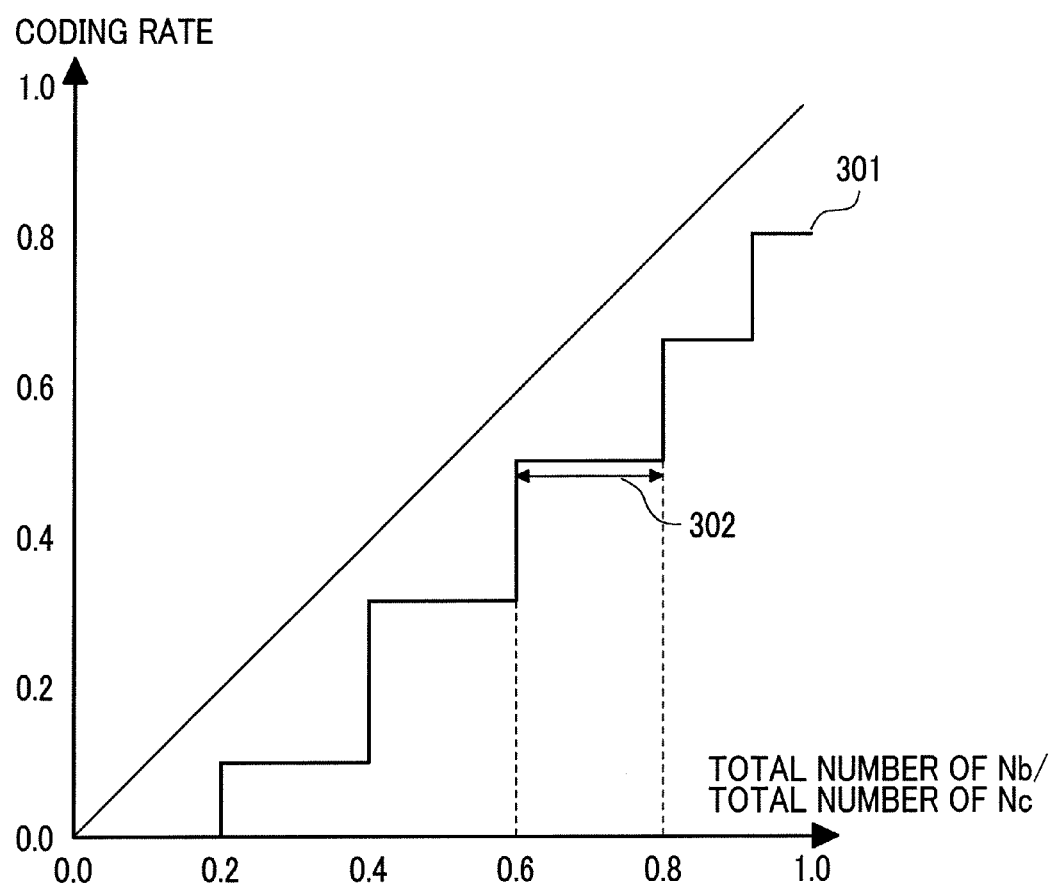
FIG. 3 is a graph showing the relationship between the number of bits for communication through adaptive modulation and the channel encoding rate in accordance with the present invention.
Figure 4:
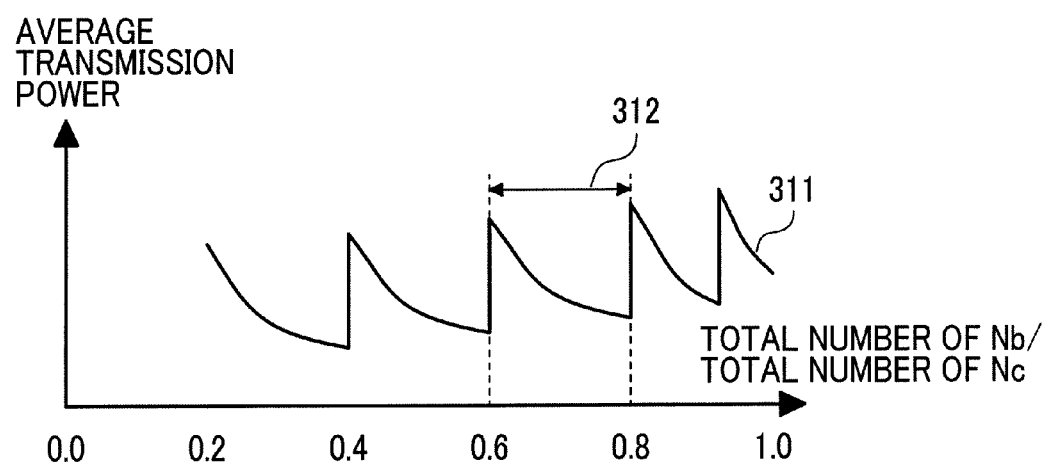
FIG. 4 is a graph showing the relationship between the number of bits for communication through adaptive modulation and the transmission power in accordance with the present invention.

In the relationship 301 of FIG. 3, a constant channel encoding rate is selected, for example, within the range 302. However, energy used per bit of the transmitting information can be stabilized and the communication quality can also be improved by controlling the power so that the transmission power becomes larger as the quotient between the total sum of Nb and the total sum of Nc becomes small in the section 312 to select the identical channel encoding rate, as seen in the diagram of FIG. 4, which shows the relationship between the quotient of the total sum of Nb and total sum Nc and the transmission power.

In the code selection scheme described above, the channel encoding rate is selected with reference to the quotient of the total sum of Nb and total sum of Nc. However, it is also possible to introduce the propagation path quality as the selection criterion of the channel encoding rate. A similar effect can also be attained with the encoding type selecting method. For example, it is possible that, under the condition that the value obtained by multiplying a coefficient having a positive correlation with the error correction capability of the channel code to a value obtained by dividing the total sum of the communication path capacity of the propagation path in the section to transmit one codeword with the total sum of Nc is defined as the reference value, the type where the channel encoding rate is nearest to the reference value among the encoding type list is selected, or the type where the channel encoding rate is largest within the range not exceeding the reference value among the encoding type list is selected, or the type where the channel coding rate is smallest within the range not exceeding the reference value is selected.

The adaptive modulator 130 divides the codeword generated by the channel encoder 120 into each subcarrier in a unit of the maximum bits Nc per symbol of each subcarrier, and it generates a transmission signal by modulating the signal with the modulation type of subcarrier using the number of bits Nb used for communication per symbol of the modulation type of subcarrier selected by the adaptive modulation controller 110 among the Nc bits distributed for each subcarrier. In this case, the bits not used for transmission as many as the difference between the Nc bits and Nb bits are generated; however, these bits are not used for transmission, but not wasted.

Next, the adaptive demodulation controller and decoder of the receiver station and processes in the demodulator will be described in detail with reference to FIG. 2. In the receiver station, the adaptive demodulation controller 210 selects the modulation type 214 to be used for demodulation of each carrier from the propagation path quality 211 of each subcarrier and obtains the number of bits Nd 215 to be used for communication per symbol of the selected modulation type. In the following description and figures, a value expressed by Nd indicates the number of bits used for communication per symbol selected in the transmitter station side.

Here, for selection of the modulation type of each subcarrier, for example, signal power intensity, interference power intensity, signal to interference and noise power ratio, etc. may be used as a measure of the propagation path quality, as in the case of the transmitter station.

Moreover, the threshold value can be selected so that, for example, the threshold value is selected to 212 to select the modulation type in a modulation level higher than QPSK when the propagation path capacity of the subcarrier assumed from the propagation path quality 211 of each subcarrier is larger than 2, which is the number of bits used for communication per symbol of QPSK. In addition, the threshold value is selected to 213 to select the modulation type in a modulation level higher than 16QAM when the capacity is larger than 4, which is the number of bits used for communication per symbol of 16QAM. When further improvement in the quality of propagation paths is required, the threshold value may be selected according to the code used, the modulation type and the propagation path characteristic. Moreover, the communication quality can also be improved by setting the threshold values 212, 213 in the receiver station to values smaller than the threshold values 112, 113 in the transmitter station.

It is most desirable that the propagation path quality 211 measured with the receiver station is matched with the propagation path quality 111 measured with the transmitter station (indicated with a dotted line in the figure), but these are not always matched due to a difference in the physical environment of the transmitter station and the receiver station and the timing of the measurement. As a result, in the adaptive modulation and channel encoding type processing of the present invention, the modulation type 214 selected in the receiver station is not always matched with the modulation type 114 selected for transmission in the transmitter station. However, in accordance with the present invention, since the maximum bits Nc per symbol of each subcarrier is fixed without relation to the modulation types 214 and 114, an error in the selection of the modulation type is never related to an error in the modulation result of the other subcarrier. Moreover, since the error correction capability of the code is used, the characteristics are never deteriorated to a large extent even when different modulation types are selected in the transmitter station and receiver station. Therefore, when a code having a sufficient error correction capability is used, a means for attaining the accurate matching of the modulation type in the transmitter station and receiver station is no longer required, unlike the conventional technique.

The adaptive demodulator 230 executes the demodulation process with the modulation type used for demodulation of each subcarrier selected by the adaptive demodulation controller 210 to obtain the signal of Nd bits, adds the signal under the assumption that the signal having a degree of likeliness of 0 is received as much as the difference between the Nc bits and Nd bits, and then outputs the signal of Nc bits in total for each subcarrier to the decoder 220.

The decoder 220 executes, on trial, the decoding by selecting one or multiple channel encoding types from the encoding type list provided in common for the transmitter station and completes the demodulation of the transmission information under the assumption that the data is encoded in the transmitter station with the type succeeded in the demodulation. Determination for successful demodulation can be made when no error can be detected in the demodulation process, for example, even after the detection signal, such as parity and CRC, is added at the time of transmission.

When the demodulations by multiple channel encoding types are attempted for trial with the channel decoder 220, calculations can be saved, for example, with the method for estimating the encoding type from Nd and Nc using a method similar to the method for selecting the encoding method in the transmitter station and then executing on trial with priority the estimated method and with the method for executing on trial with the priority the encoding type succeeded in the previous decoding.

As a result of the channel decoding process described above, the decoding result and error detection signal are sent to a host communication layer from the channel decoder 220 as the reception result of the receiver station of the present invention.

Figure 12:
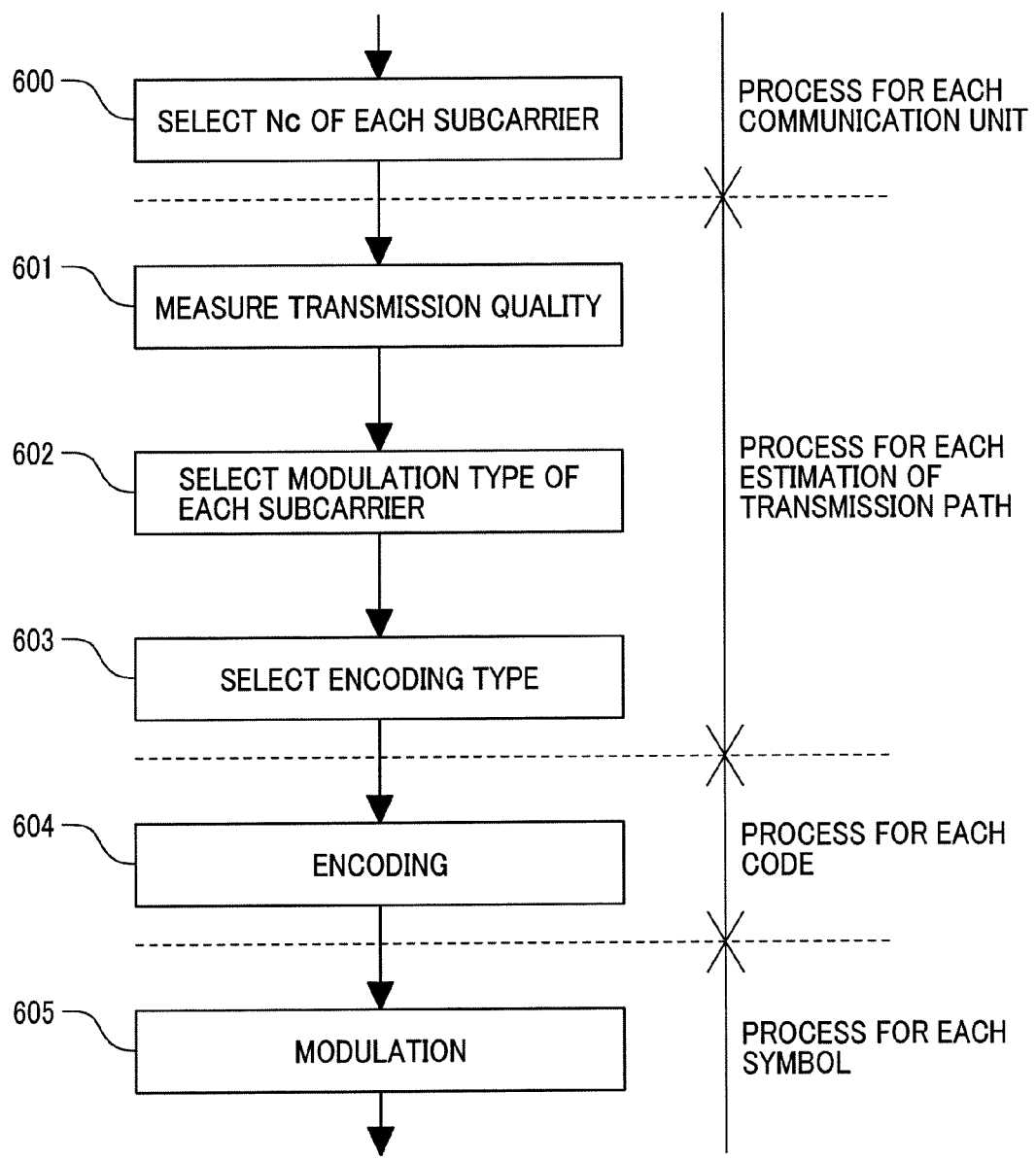
FIG. 12 is a flow diagram showing an example of process flow in the transmitter station of the present invention.
Figure 13:
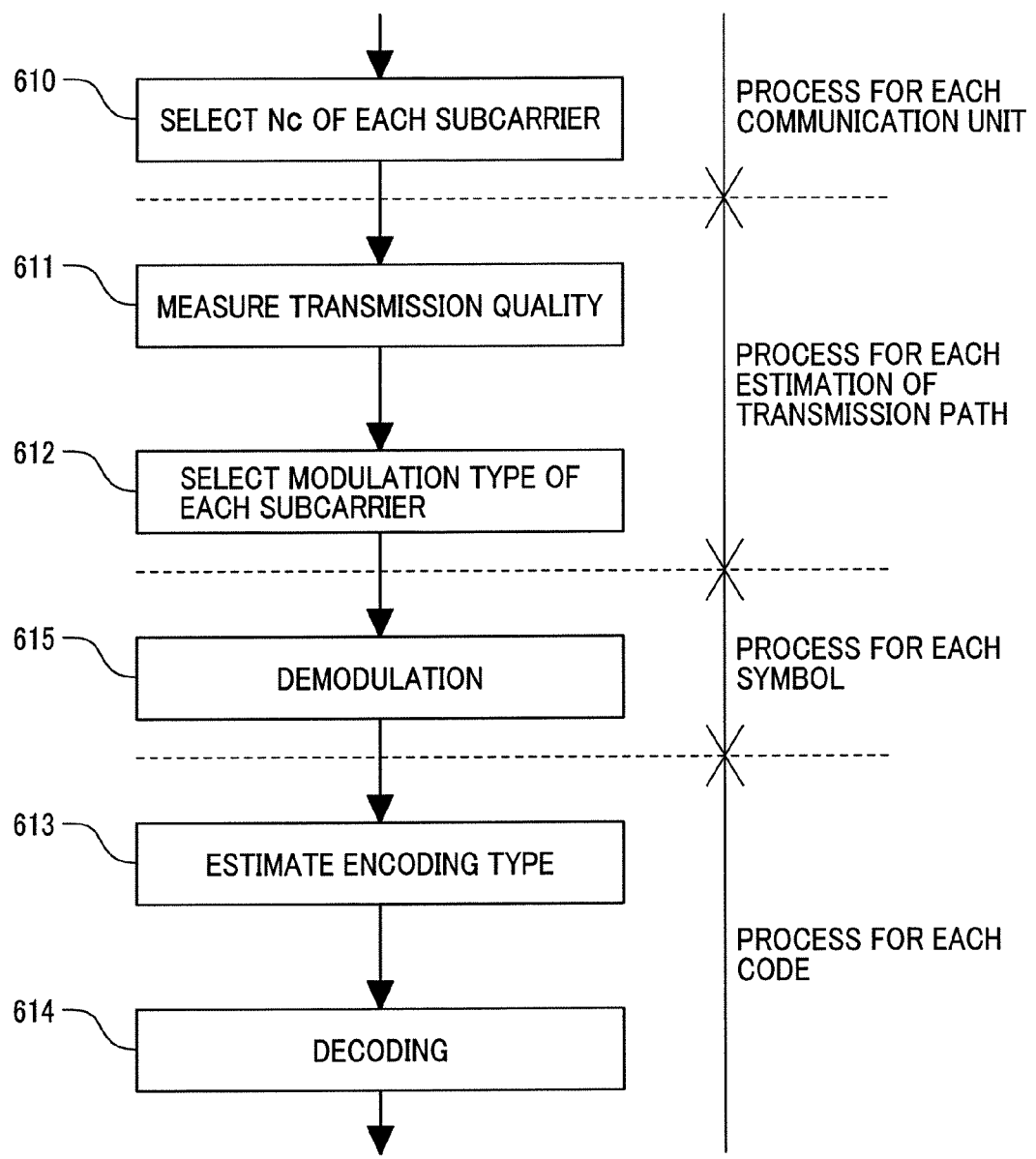
FIG. 13 is a flow diagram showing an example of process flow in the receiver station of the present invention.

In regard to the adaptive modulation and channel encoding in accordance with the present invention, the process flow in the transfer station is illustrated in FIG. 12, while the process flow in the receiver station is illustrated in FIG. 13.

In the process flow shown in FIG. 12, the transmitter station is first selects the maximum bits Nc per symbol of each subcarrier with the process 600. The process 600 is sufficient when it is executed in a series of communication units, and this process is also executed with the interval for which this process is set once when the communication is started.

Next, the transmitter station measures the propagation path quality in the process 601, selects the modulation type of each subcarrier in the process 602, based on the result of measurement, and selects the channel encoding type in the process 603. These processes are performed with the interval following the variation rate of the propagation path. Namely, when the variation rate of the propagation path is identical to the code length, the type of processes 602 and 603 is selected on the basis of the result of measurement in the process 601 under the interval of about each transmission of code. When variation of the propagation path is rather lower in comparison with the code length, the process is performed with the lower interval. Next, the transmission information is encoded in the process 604 in the transmitter station in every code and the encoded information is transmitted through modulation with the process 605 in unit of symbol.

In the process flow shown in FIG. 13, the receiver station first selects, in the process 610, the maximum bits Nc per symbol of each subcarrier. The process 610 is sufficient when it is executed in every series of communication units like the process 600 in the transmitter station with the interval for which it is executed once when the communication is started.

Moreover, the process 510 must be executed in the same timing as the process 600 in the transmitter station.

Next, the receiver station measures the propagation path quality in the process 611 and selects the modulation type used for demodulation of each subcarrier in the process 612 on the basis of the result of measurement. These processes are executed in the interval following the variation rate of the propagation path. When the variation rate of the propagation path is identical to the code length, the type in the process 612 is selected based on the result of measurement in the process 611 with the interval similar to the code length of the receiving signal. When the variation of propagation path is rather lower than the code length, this process is executed in the lower interval. The interval of this process is desirably similar to that of the processes 601, 602 and 603, but it is not always required to be matched therewith.

Next, the receiver station demodulates the received signal based on the modulation type selected in the process 612, estimates the channel encoding type in the process 613 for every completion of the demodulation of the code length, and executes the decoding process in the process 614. The processes 613 and 614 are executed once for every completion of the demodulation of the code length when the receiver station includes multiple decoders like the receiver station of FIG. 8. Meanwhile, when the receiver station uses only one decoder through the switching operations like the receiver station of FIG. 7, it executes on trial the decoding with the candidate type for every completion of the demodulation of the code length. If decoding fails, the decoding is executed on trial with a different type, and when the decoding has succeeded, the process is completed.

The modulation type has been described above for $2^{2m}$QAM. However, application of the present invention is not limited to $2^{2m}$QAM. For example, the present invention can be adapted to the a modulation type in which signal point allocation can be resettably expanded, for example, using the Gray code, and assignment of bits to the signal point can be set. A similar control can also be adapted to $2^m$PSK and $2^m$ASK by defining the maximum bits per symbol as m bits.

Moreover, the discussion of code and encoding appearing in the above description does not suggest only encoding by use of the error correction code, such as a simple convolutional encoding and Turbo encoding, but more generally indicates the mapping to the bit train for modulation from the information as the communication object. For example, processes including he signal processes for addition of an error detection code, interleave, repetition and puncture are called encoding.

In above description, moreover, the number of bits called the bits per symbol or the maximum bits per symbol corresponds to the number of bits of a codeword after the encoding, and this number of bits can be made to correspond to the number of transmission information bits by multiplying it by an encoding rate of the code.

Moreover, in above description, communication is performed by dividing the information into multiple subcarriers using IFFT and FFT operations in propagation paths which are different in quality for every frequency used. However, the present invention can be generally applied to a system for effecting communication by dividing the information into plural communication units of different quality.

Figure 9:
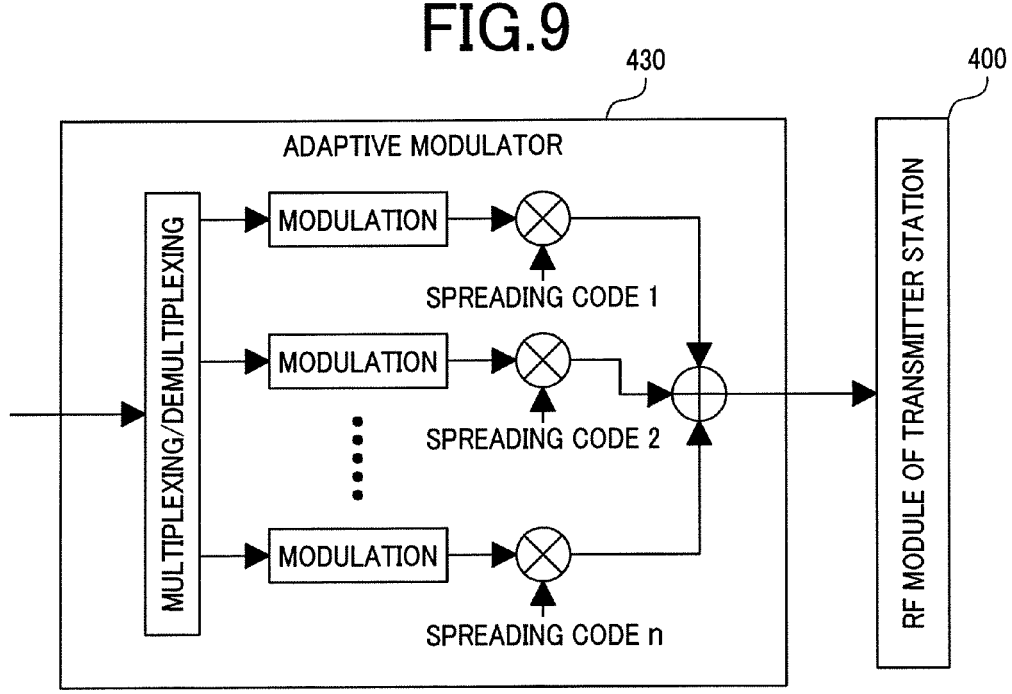
FIG. 9 is a functional block diagram showing an embodiment of an adaptive modulator of the transmitter station in the case where the present invention is adapted to a system for transmitting information by employing multiple codes.

For example, the adaptive modulator may take the form illustrated in FIG. 9. It is also possible in accordance with the present invention that, in the adaptive modulator 430 of FIG. 9, the data is spread, using a code like the Walsh code in place of performing a IFFT, and is despread in the adaptive demodulator 530 in place of a FFT, and the codeword is divided into multiple codes.

Figure 10:
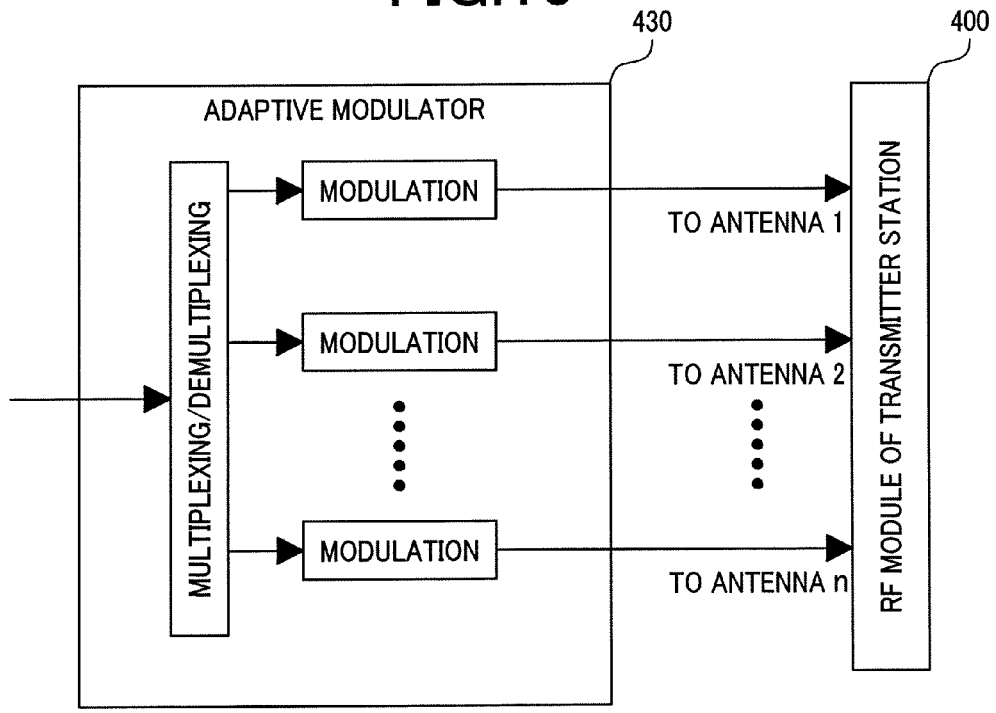
FIG. 10 is a functional block diagram showing an embodiment of the adaptive modulator of the transmitter station in the case where the present invention is adapted to a system for transmitting information by employing multiple antennas.

Moreover, the present invention can also be applied in a manner such that, in place of performing IFFT in the adaptive modulator 430, the signal is divided as illustrated in FIG. 10 and the modulated signals are transmitted from different antennas; and, moreover, in place of performing FFT in the adaptive demodulator 530, the codeword is divided for multiple antennas for transmission by executing an interference eliminating process to isolate the signals received with multiple antennas into respective signals for each transmitting antenna.

Figure 11:
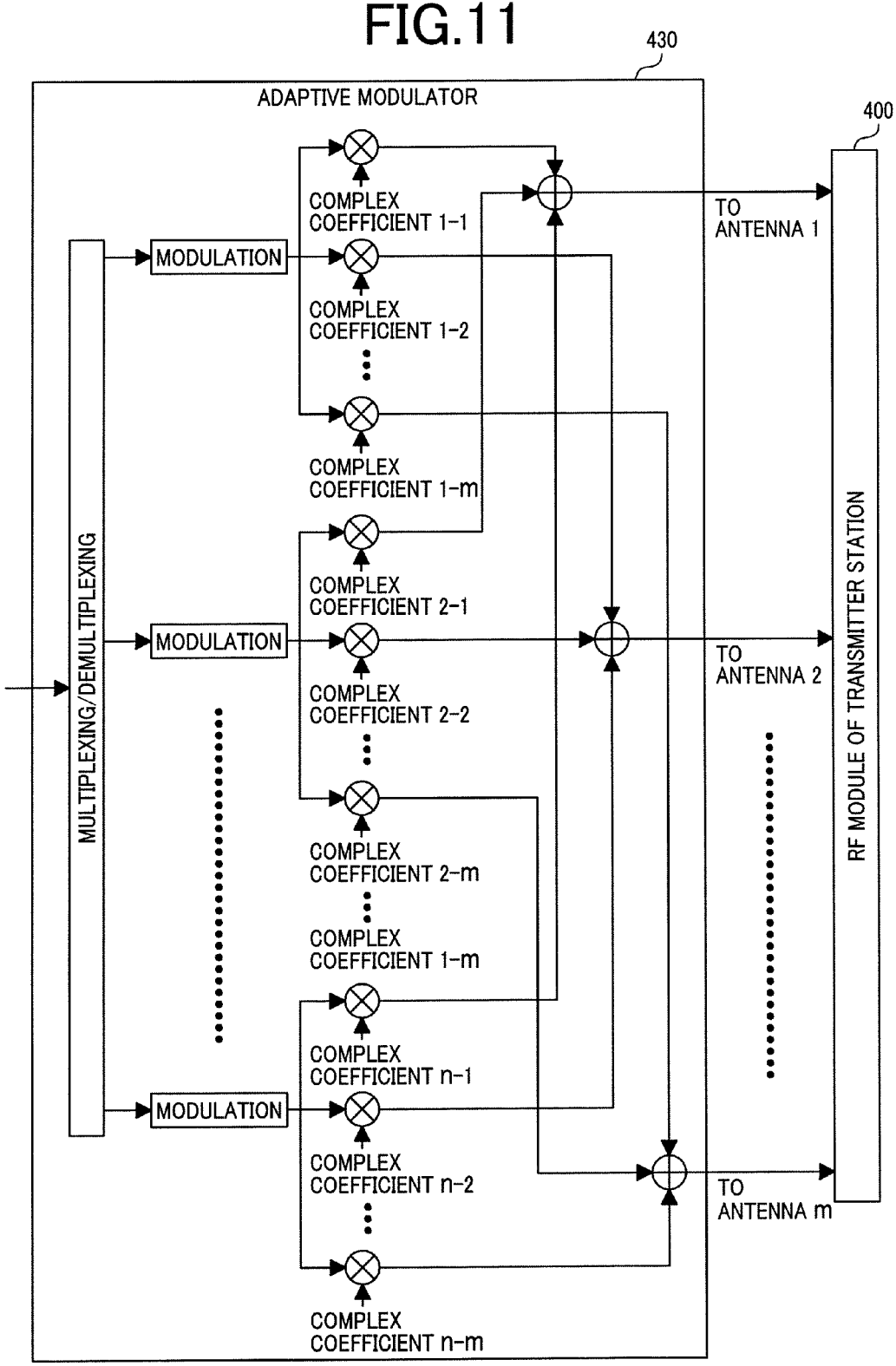
FIG. 11 is a schematic diagram showing an embodiment of the adaptive modulator of the transmitter station in the case where the present invention is adapted to a system for transmitting information by employing multiple beam patterns.

The present invention can also be applied in such a manner that, in place of performing IFFT in the adaptive modulator 430, the signal is divided, for example, as illustrated in FIG. 11 and the signals are transmitted from different antennas after the primary conversion by multiplying a complex coefficient to the modulated signals; and, moreover, in place of performing FFT in the adaptive demodulator 530, the signals received with multiple antennas are subjected to the interference eliminating process to isolate the signals before primary conversion at the transmitter station in order to realize division of the codeword into multiple beam patterns.

What is claimed is:

1. A radio communication system comprising:
   a first radio station; and
   a second radio station;
   wherein the first and second radio stations have common information of a first number of bits which is equal to a maximum number of bits per a communication unit, and an encoding type list including encoding types and code lengths after encoding;
   wherein the first radio station is configured to:
   generate codewords by encoding transmission information,
   generate a plurality of parts of codewords by picking up a first number of bits from the codewords,
   transmit at least one communication unit by picking up a second number of bits which is equal to or less than the first number of bits from the parts of codewords; and
   wherein the second radio station is configured to:
   receive and demodulate at least one communication unit transmitted by the first radio station, and
   combine and decode the demodulated signals of the at least one communication unit, including adding a third number of signals each corresponding to a smallest likelihood, the third number of signals also corresponding to the difference of the first number of bits and the second number of bits.

2. A radio communication system according to claim 1, wherein the communication unit corresponds to a plurality of modulation symbols.

3. A radio communication system according to claim 1, wherein the communication unit corresponds to a plurality of subcarriers.

4. A transmitter station, for transmitting information to a receiver station in a radio communication system, comprising:
   a memory means for storing information of a first number of bits as a maximum number of bits per communication unit, and an encoding type list including encoding types and code lengths after encoding, which is used for encoding the transmission information;
   a channel encoding means for generating codewords by encoding the transmission information with one of the encoding types listed in the encoding type list, and for generating a plurality of parts of codewords by picking up the first number of bits from the codewords; and a transmitting means for transmitting one or a plurality of communication units, at least in part by picking up from the parts of codewords a second number of bits which is equal to or less than the first number of bits.

5. A transmitter station according to claim 4, wherein the communication unit correspond to a plurality of modulation symbols.

6. A transmitter station according to claim 4, wherein the communication unit corresponds to a plurality of subcarriers.

7. A transmitter station, for transmitting information to a receiver station in a radio communication system, comprising:

a memory configured to store information of a first number of bits as a maximum number of bits per communication unit, and an encoding type list including encoding types and code lengths after encoding, which is used for encoding the transmission information;

a channel encoder configured to generate codewords by encoding the transmission information with one of the encoding types listed in the encoding type list, and to generate a plurality of parts of codewords by picking up the first number of bits from the codewords; and a transmitter configured to transmit at least one communication unit at least in part by picking up from the parts of codewords a second number of bits which is equal to or less than the first number of bits.

8. A transmitter station according to claim 7, wherein the communication unit correspond to a plurality of modulation symbols.

9. A transmitter station according to claim 7, wherein the communication unit corresponds to a plurality of subcarriers.

* * * * *